Jan. 19, 1926.　　　　　　　　　　　　　　　　1,570,051
F. DOMBROWSKI
ANTISKID ATTACHMENT FOR VEHICLE WHEELS
Filed April 13, 1925　　　2 Sheets-Sheet 1

Jan. 19, 1926. 1,570,051
F. DOMBROWSKI
ANTISKID ATTACHMENT FOR VEHICLE WHEELS
Filed April 13, 1925  2 Sheets-Sheet 2
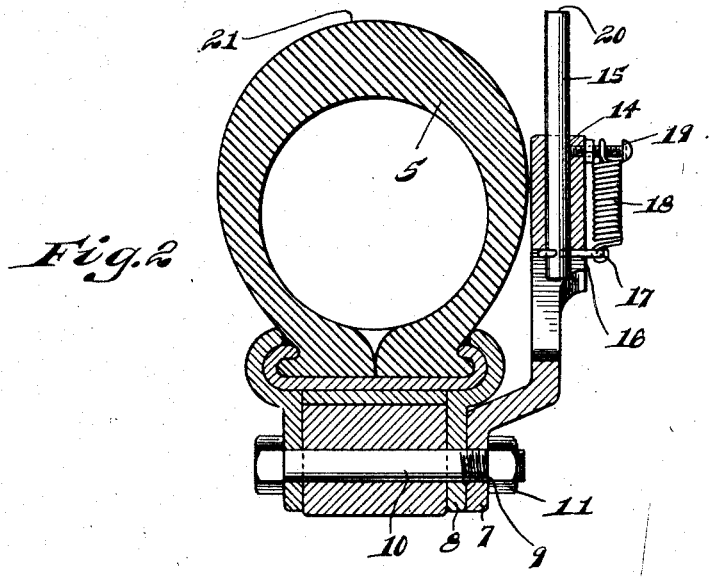
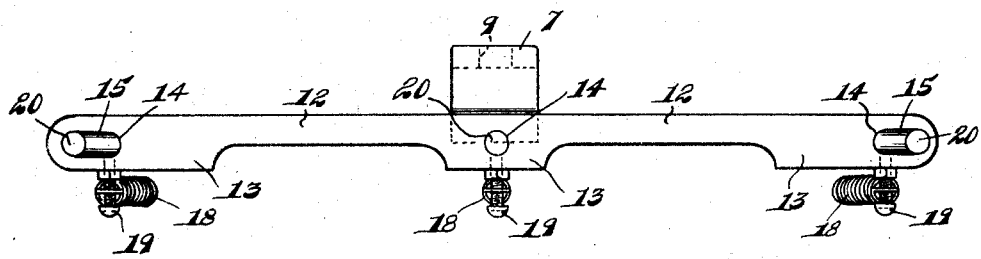
Witnesses
Inventor:
Fred Dombrowski,
By Joshua R H Potts
his Attorney.

Patented Jan. 19, 1926.

1,570,051

UNITED STATES PATENT OFFICE.

FRED DOMBROWSKI, OF CHICAGO, ILLINOIS.

ANTISKID ATTACHMENT FOR VEHICLE WHEELS.

Application filed April 13, 1925. Serial No. 22,533.

*To all whom it may concern:*

Be it known that I, FRED DOMBROWSKI, a citizen of the United States, and a resident of the city of Chicago, county of Cook, and State of Illinois, have invented certain new and useful Improvements in Antiskid Attachments for Vehicle Wheels, of which the following is a specification.

My invention relates to antiskid attachments for vehicle wheels, designed especially for use in connection with pneumatic-tired wheels and having means whereby to be secured with the fastening bolts for the wheel rims, and the main object of my invention is the provision of an improved attachment of this character which will be highly efficient in use and economical in manufacture.

Other objects will appear hereinafter.

The invention consists in the combinations and arrangements of parts hereinafter described and claimed.

The invention will be best understood by reference to the accompanying drawings, forming a part of this specification, and in which, Fig. 1 is a face view of a pneumatic-tired wheel, showing the application thereto of embodiments of my invention;

Fig. 2 is a cross section taken on the line 2—2 of Fig. 1; and

Fig. 3 represents an outer edge or tread view of a single shoe attachment detached from the vehicle wheel.

Figure 1:
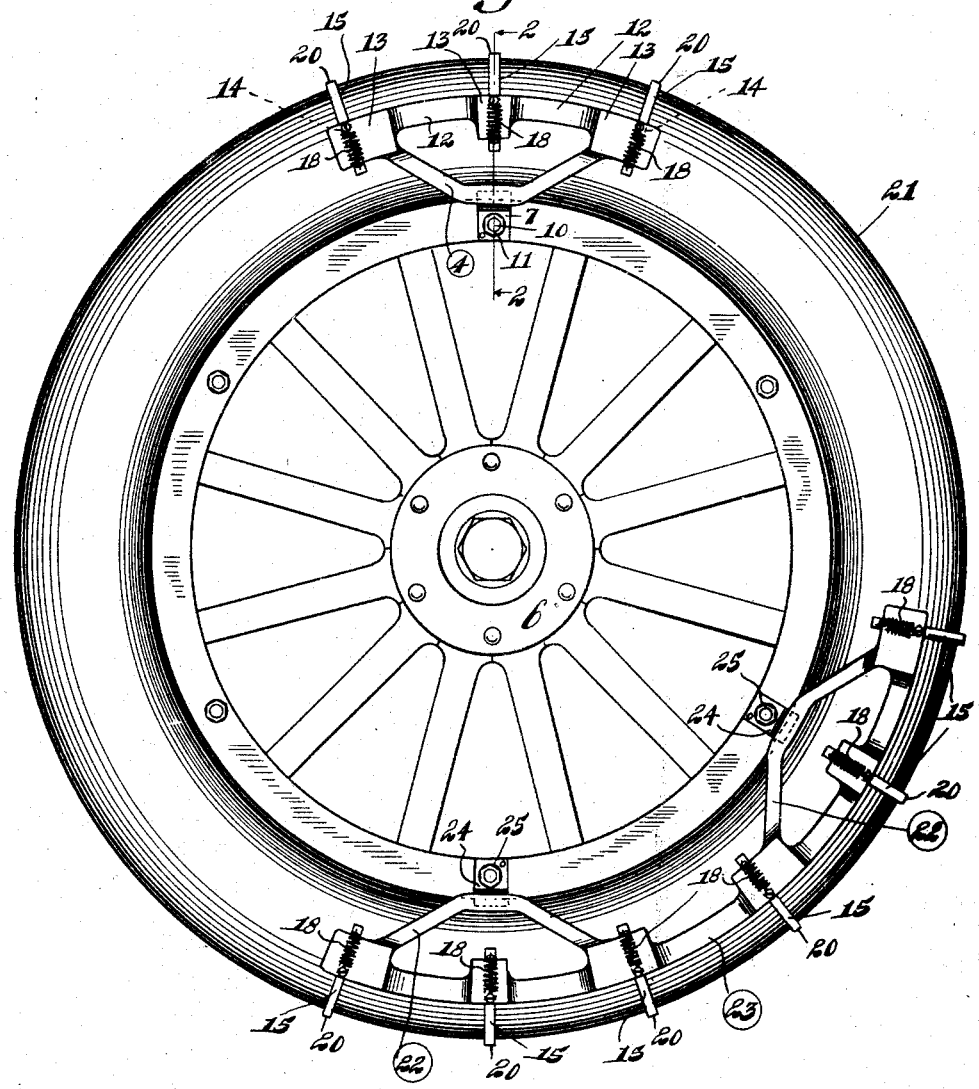

A preferred embodiment of my invention as illustrated in the accompanying drawings includes a shoe member 4 designed to extend alongside a pneumatic tire as 5 on the outer face of the wheel 6. At its inner or hub approaching end, the shoe is provided with a laterally offset bracket 7 designed to fit flat upon the wheel rim 8 and having an aperture 9 designed to receive the rim fastening bolt 10 and to be secured rigidly therewith by means of the usual securing nut 11 applied to the outer end of said fastening bolt.

The shoe 4 has an arc-shaped portion 12 which conforms with the shape of the pneumatic tire 5, and the same is made preferably with spaced apart enlargements 13 holed through at 14 to provide suitable bearings for the ground engaging pin members 15. The holes or bearings 14 are produced in radial relation with respect to the center or hub of the wheel. The ground engaging pins 15 have free lengthwise movement in their bearings. Through the inner ends of the pin members are passed cotter pins 16 having eyes 17 with which are connected the inner ends of the pull springs 18 whose outer ends are secured upon the screw posts 19 suitably tapped into the enlarged portions 13. The pin members 15 are, therefore, forced outwardly by the springs 18, but the outward movements thereof are arrested by the engagement of the cotter pins with the adjacent sides of the enlarged regions 13. These parts are so proportioned and related that the pin members 15 are normally thrust outward with their extremities 20 projecting an appreciable distance beyond the curve of the circumference 21 of the pneumatic tire. During travel of the wheel, the pin members 15 first engage the ground or roadway at an angle and then as the wheel brings them into vertical or substantially vertical relation to the ground or roadway they yield inwardly to the curve of the wheel circumference 21. This anti-skid attachment may be quickly attached, since it is only necessary to remove the securing nut 11 and apply the bracket 7 to the rim fastening bolt 10 and then re-apply the securing nut 11.

In accordance with an important feature of the present invention, the anti-skid attachment may be made either in accordance with the single shoe 4 or in accordance with the double shoes 22 having a common arc-shaped portion 23. By making the attachment in this manner, two brackets 24 are provided for securing the attachment with the wheel rim, it being understood that these brackets must be made so that they will come in proper position for securement upon two adjacent fastening bolts as 25. Attachments made with the double shoes 22 thus have two points of engagement with the securing means for the wheel rim and are accordingly held more securely to the wheel.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In combination in a device of the kind described, a shoe member adapted to be secured to the side of a wheel, and pins mounted in the shoe and normally forced outwardly into position for engagement with the roadway, substantially as described.

2. In combination in a device of the kind described, a shoe member adapted to be secured with the rim securing means, ground engaging pin members freely movable in the shoe, and means forcing said pin members outwardly into ground engaging position, substantially as described.

3. In combination in a device of the kind described, a shoe member adapted to extend alongside the tire, a bracket provided on the shoe and adapted to be secured upon the rim fastening bolt, and pin members having lengthwise movement in said shoe and normally forced outwardly into position for engagement with the ground, substantially as described.

4. In combination in a device of the kind described, a shoe member having means for securement with the rim securing means, bearings provided in said shoe member, pin members mounted in said bearings and freely movable therein, and springs acting on said pin members and normally forcing them into outward position for engagement with the roadway, substantially as described.

5. In combination in a device of the kind described, a shoe member having means for securement with the rim securing means and having a portion extending alongside the tire and arc-shaped in formation corresponding with the shape of the tire, radially arranged bearings in said arc-shaped portion, pin members movable lengthwise in said bearings, and resilient means forcing said pin members outwardly into position to engage the roadway, substantially as described.

6. A device of the kind described including a shoe member adapted to be secured rigid with the wheel rim, a bearing provided in said shoe member, a pin member freely movable in the bearing, a spring forcing said pin member outwardly into position to engage the roadway, and means limiting the outward movement of the pin member, substantially as described.

7. A device of the kind described including a shoe member adapted to extend alongside the wheel tire, means provided on the shoe member whereby to secure it rigid with the wheel rim, an outer portion on the shoe member of arc-shape in formation corresponding to the shape of the tire, there being a plurality of radially arranged bearings in said arc-shaped portion, pins movable freely in said bearings, and resilient means forcing said pins outwardly with their extremities projecting beyond the curve of the periphery of the tire, substantially as described.

In testimony whereof I have signed my name to this specification.

FRED DOMBROWSKI.